United States Patent
Arunkumar et al.

(10) Patent No.: US 10,691,789 B2
(45) Date of Patent: Jun. 23, 2020

(54) AUTHENTICATION/SECURITY USING USER ACTIVITY MINING BASED LIVE QUESTION-ANSWERING

(71) Applicant: International Business Machines Corporation, Armonk, NY (US)

(72) Inventors: Saritha Arunkumar, Basingstoke (GB); Kuntal Dey, Vasant Kunj (IN); Nizar Lethif, Croton-on-Hudson, NY (US); Enara C. Vijil, Millwood, NY (US)

(73) Assignee: International Business Machines Corporation, Armonk, NY (US)

( * ) Notice: Subject to any disclaimer, the term of this patent is extended or adjusted under 35 U.S.C. 154(b) by 205 days.

(21) Appl. No.: 15/846,411

(22) Filed: Dec. 19, 2017

(65) Prior Publication Data

US 2019/0188374 A1    Jun. 20, 2019

(51) Int. Cl.
  *G06F 21/45*    (2013.01)
  *G06F 21/31*    (2013.01)
  *G06F 21/30*    (2013.01)

(52) U.S. Cl.
  CPC ............ *G06F 21/45* (2013.01); *G06F 21/305* (2013.01); *G06F 21/316* (2013.01); *G06F 2221/2103* (2013.01)

(58) Field of Classification Search
  CPC ............. G06F 2221/2103; G06F 21/45; G06F 21/305; G06F 21/316; H04L 63/108; H04L 67/10
  See application file for complete search history.

(56) References Cited

U.S. PATENT DOCUMENTS 6,636,973 B1    10/2003    Novoa et al.
7,689,006 B2    3/2010    Govindaraju et al.
(Continued)

FOREIGN PATENT DOCUMENTS

CN    101408754 B  * 12/2010
WO    2008001382 A3    4/2009
(Continued)

OTHER PUBLICATIONS

Dragomir R. Radev, et al., Jan. 2001, Mining the Web for Answers to Natural Language Questions, https://www.researchgate.net/publication/221614801, pp. 1-9.*
(Continued)

*Primary Examiner* — Farid Homayounmehr
*Assistant Examiner* — Raied A Salman
(74) *Attorney, Agent, or Firm* — Law Office of Jim Boice (57) ABSTRACT

A processor-implemented method enables a device based on authentication of a particular user. One or more processors data mine past activities of a particular user. The past activities are detected by physical monitoring devices that monitor the particular user. The processor(s) create an authentication question and answer for the particular user based on the past activities of the particular user that the one or more processors have data mined. The processor(s) receive a request to use an electronic device used by the particular user, and then 1) transmit the authentication question to the electronic device used by the particular user and 2) receive an authentication answer to the authentication question from the electronic device used by the particular user. In response to the authentication answer from the electronic device matching the answer for the authentication question, the processor(s) remotely enable the electronic device for the particular user.

16 Claims, 7 Drawing Sheets

(56) References Cited

U.S. PATENT DOCUMENTS

| | | | |
|---|---|---|---|
| 8,625,796 B1 | 1/2014 | Ben Ayed | |
| 9,374,379 B1* | 6/2016 | Hew | H04L 63/108 |
| 2002/0184509 A1 | 12/2002 | Scheidt et al. | |
| 2003/0154406 A1 | 8/2003 | Honarvar et al. | |
| 2009/0213844 A1* | 8/2009 | Hughston | H04M 3/4872 |
| | | | 370/352 |
| 2010/0106600 A1* | 4/2010 | Chatow | G06Q 30/02 |
| | | | 705/14.54 |
| 2010/0146259 A1 | 6/2010 | Tatham | |
| 2010/0257357 A1 | 10/2010 | McClain | |
| 2013/0269013 A1* | 10/2013 | Parry | H04L 63/0861 |
| | | | 726/7 |
| 2015/0082167 A1* | 3/2015 | Yeh | H04W 4/80 |
| | | | 715/716 |
| 2015/0249540 A1 | 9/2015 | Khalil et al. | |
| 2016/0292411 A1* | 10/2016 | Huang | H04L 63/08 |
| 2018/0345078 A1* | 12/2018 | Blahnik | A63B 24/0062 |

FOREIGN PATENT DOCUMENTS

| | | |
|---|---|---|
| WO | 2010043722 A1 | 4/2010 |
| WO | 2014005004 A1 | 1/2014 |

OTHER PUBLICATIONS

Vibha Singhal Sinha, et al., May 2013, Exploring activeness of users in QA forums, 2013 10th Working Conference on Mining Software Repositories (MSR), pp. 1-4.*

P. Mell et al., "The NIST Definition of Cloud Computing", National Institute of Standards and Technology, Information Technology Laboratory, Sep. 2011, pp. 1-7.

Chetty et al., "Password Less Security System Using Multifactor Biometric Fusion". IICAI 2007.

Lawrence O'Gorman, "Comparing Passwords, Tokens, and Biometrics for User Authentication". Proceedings of the IEEE 91.12 (2003): 2021-2040.

Pham et al., "Multi-Factor EEG-Based User Authentication". 2014 International Joint Conference on Neural Networks (IJCNN). IEEE (2014): 4029-4034.

Bardram et al., "Context-Aware User Authentication—Supporting Proximity-Based Login in Pervasive Computing". Conference: 5th International Conference on Ubiquitous Computing, vol. 2864, Lecture Notes in Computer Science, Jan. 2003.

* cited by examiner

In order to authenticate your identity, please answer the following question:

What did you do at 8:30 AM today?
● Drank tea
○ Meditated
○ Visited the grocery store
○ Laid in bed

AUTHENTICATION/SECURITY USING USER ACTIVITY MINING BASED LIVE QUESTION-ANSWERING

TECHNICAL FIELD

The present invention relates to the field of computers, and particularly to computers that require user authentication. Still more particularly, the present invention relates to utilizing past user activities as a basis for questions used to authenticate a particular user.

SUMMARY

In one or more embodiments of the present invention, a processor-implemented method enables a device based on authentication of a particular user. One or more processors data mine past activities of a particular user. The past activities are detected by physical monitoring devices that monitor the particular user. The processor(s) create an authentication question and answer for the particular user based on the past activities of the particular user that the one or more processors have data mined. The processor(s) receive a request to use an electronic device used by the particular user, and then 1) transmit the authentication question to the electronic device used by the particular user and 2) receive an authentication answer to the authentication question from the electronic device used by the particular user. The processor(s) determine whether the authentication answer from the electronic device matches the answer for the authentication question. In response to determining that the authentication answer from the electronic device matches the answer for the authentication question, the processor(s) remotely enable the electronic device for the particular user.

The described invention may also be implemented in a computer system and/or as a computer program product.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Hash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
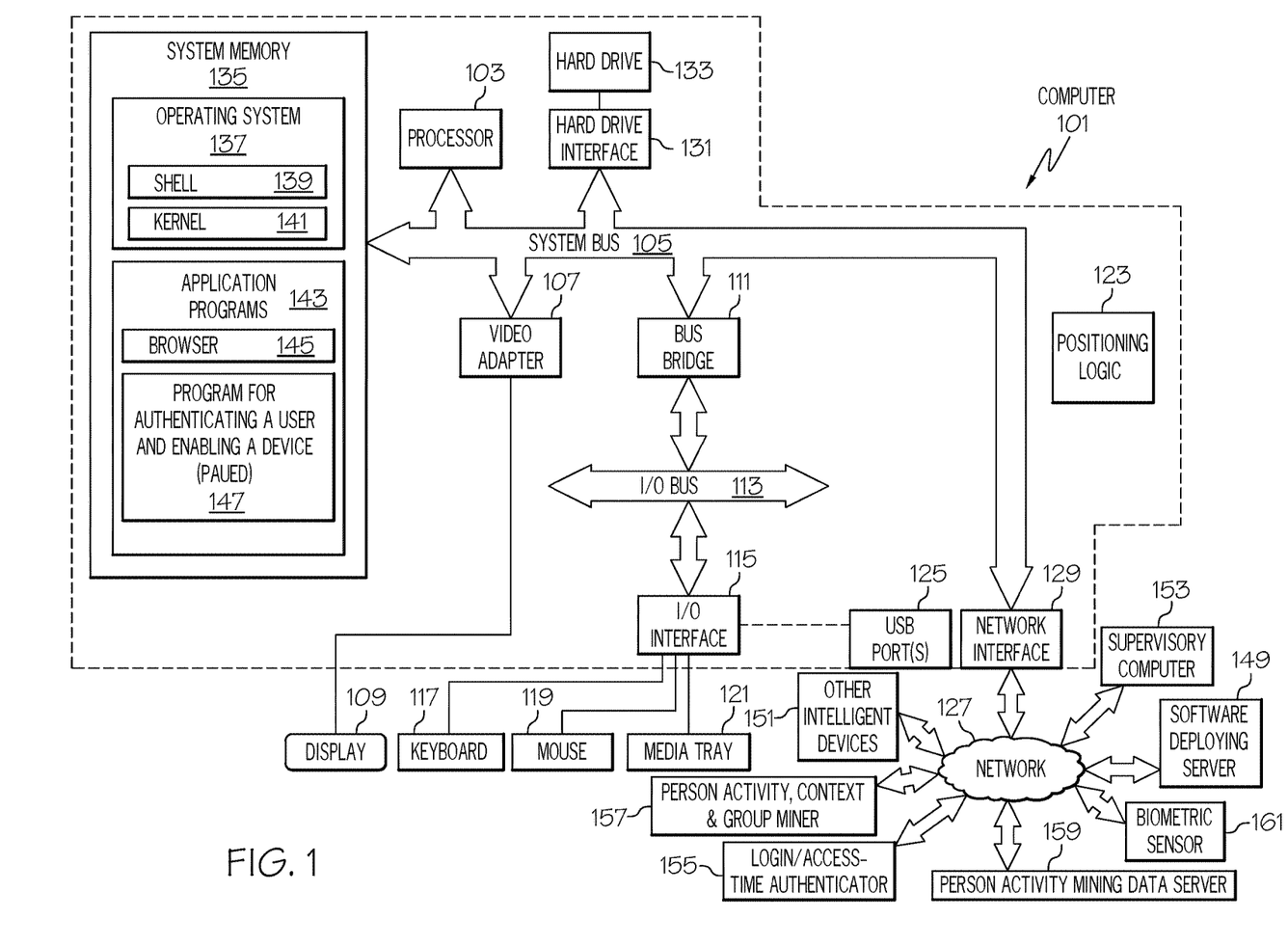
FIG. 1 depicts an exemplary system and network in which the present disclosure may be implemented.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or other intelligent devices 151 and/or supervisory computer 153 and/or login/access-time authenticator 155 and/or person activity, context and group miner 157 and/or person activity mining data server 159 and/or biometric sensor 161 shown in FIG. 1. In an embodiment of the present invention, one or more of other intelligent devices 151 and supervisory computer 153 and login/access-time authenticator 155 and person activity, context and group miner 157 and person activity mining data server 159 and/or biometric sensor 161 are different devices. In another embodiment of the present invention, one or more of the other intelligent devices 151 and supervisory computer 153 and login/access-time authenticator 155 and person activity, context and group miner 157 and person activity mining data server 159 and/or biometric sensor 161 are a same device.

Exemplary computer 101 includes a processor 103 that is coupled to a system bus 105. Processor 103 may utilize one or more processors, each of which has one or more processor cores. A video adapter 107, which drives/supports a display 109 (which may be a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multimedia interfaces, etc.), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include a Program for Authenticating a User and Enabling a Device (PAUED) 147. PAUED 147 includes code for implementing the processes described below, including those described in FIGS. 2-5. In one embodiment, computer 101 is able to download PAUED 147 from software deploying server 149, including in an on-demand basis, wherein the code in PAUED 147 is not downloaded until needed for execution. In one embodiment of the present invention, software deploying server 149 performs all of the functions associated with the present invention (including execution of PAUED 147), thus freeing computer 101 from having to use its own internal computing resources to execute PAUED 147.

A positioning logic 123 in computer 101 is logic that tracks, stores, and otherwise determines real-time positions of computer 101. Examples of positioning logic 123 include, but are not limited to, a Global Positioning System (GPS) device that established geophysical coordinates for a real-time location of computer 101 based on signals from GPS space satellites; accelerometers that monitor and maintain a record of changes in movement of computer 101, etc.

Biometric sensor 161 is a sensor that detects, records, and/or transmits data about a user of person who is in proximity to computer 101. For example, biometric sensor 161 may be one or more of a thermometer (that detects body temperature), a skin galvanometer (that detects skin resistance changes based on sweating, etc.), a respiration monitor (e.g., that detects chest movement to indicate respiration rate), a heart monitor (e.g., an electrocardiogram—EKG/ECG monitor that tracks heart rate, cardiac electrical activity, etc.), etc.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Many electronic devices (e.g., smart phones, laptop computers, desktop computers, servers, etc.) and/or applications (e.g., banking applications, shopping websites, etc.) require a user to enter a password in order to use the device or application.

In prior art systems, passwords are typically one or more of (a) text and/or (b) image selection and/or (c) biometrics. That is, in the prior art, a "password" may be based on the user (a) typing in a given text, (b) identifying given images, and/or (c) executing interactions such as gestures like nodding the head as instructed by the system.

The present invention presents a new and useful process for creating and utilizing a password that may stand alone, or may be used to augment a text/image/biometric password.

More specifically, the present invention utilizes a multi-factor authentication that is based on past activities of the user.

Systems, such as mobile smart phones, wearable computing devices, Internet of Thing (IoT) devices (that are able to intelligently communicate among themselves), and computer vision systems (such as closed circuit television—CCTV cameras), record what a user has done at certain locations at certain times, and communicate with other authorized devices (such as mobile phones of other individuals) nearby to get the identities of the individuals who own those devices. Note that in order to preserve the privacy of the user, the user must affirmatively express the desire to have his/her activities monitored to a supervisory system, such as supervisory computer 153 shown in FIG. 1. If such permission is not granted, the system is not enabled to monitor the user.

For example, the permission granted by the user may be a specific password that is required by supervisory computer 153 to receive activity data (e.g., location data, time stamps, etc.) from monitoring devices such as the monitoring devices 451 shown in FIG. 4 (and described below).

After the system has monitored (with the user's permission) the activities of the user, the user will attempt to login to a computer system/phone/application, access a secure area (e.g., by entering a password into a cyber lock that unlocks a gate/door), etc. The computer system and/or phone and/or application and/or cyber lock may then challenge the login activity (which may include the entry of a password) by asking the particular user about past activities, such as where they were at a particular time, etc. Such a question may be an open question or it may be a multiple choice question asking the user to choose the right answer.

For example, the supervisory computer 153 shown in FIG. 1 might ask: "Where were you last evening around 8 PM?" The position logic 123 will provide such information, either in real time or in a record, to the supervisory computer 153.

Alternatively, the supervisory computer 153 might ask, "Who were you with around 8 PM last evening and where?". In this embodiment, other persons carrying the other intelligent devices 151 must also have given supervisory computer 153 express permission to monitor their movement. As such, these other persons may also be identified, via their smart devices (other intelligent devices 151), which is a form of distributed identification.

Alternatively, the supervisory computer 153 might ask, "Among the following options, which was the place closest to you at 8 PM last evening?" and then show multiple optional answers (only one of which is correct) on the computer 101 (or smart phone using some or all of the architecture shown for computer 101) being used by the particular user.

Alternatively, the supervisory computer 153 might ask, "When were you tense last evening?" (based on readings from biometric sensor 161 shown in FIG. 1 and/or based on real-time inputs from the user into an electronic medical journal kept by the user), and then show multiple optional answers (only one of which is correct).

In the present disclosure, question-answering or question and answer refers to the generation of an authentication question and answer in the form of a question and one or more optional answers. The one or more answers may be an "open answer" in which the user inputs a correct answer, or the one or more answers may present multiple answer options for the user to select. In a preferred embodiment, only one of the multiple answer options is correct.

Exemplary Embodiment/Use Case 1

A particular user (e.g., user of computer 101) had 1) gone to his uncle's house yesterday morning, 2) had gone to a grocery store with his cousin in the late morning, 3) played with his infant niece through the afternoon, 4) met his friend Person A in the evening in an Italian cuisine restaurant, and finally 5) had come back home just before midnight.

The next morning, this particular user did yoga and meditation in the morning, and then played billiards with his friends Person B and Person C at home in the latter part of the morning.

In one or more embodiments, the system uses various sensors to identify the past activities of the particular user. For example, if a computer vision system with action inferencing system enabled "sees" this particular user playing billiards, then that will be reported to the mobile device (e.g., a smart phone owned by the particular user that uses some or all of the architecture of computer 101 shown in FIG. 1), and/or is published to a backend server (e.g., supervisory computer 153) that the mobile device is able to electronically communicate with.

Throughout the process (of monitoring the activities of the particular user), this particular user has carried his mobile phone, which has been enabled to perform the present invention.

Later in the early afternoon, assume that this particular user is now trying to log onto his email program from his computer using a web browser. Assume further that this particular user has entered his password, but the email system requires additional verification that this really is the particular user. The email server then retrieves this particular user's data that is uploaded from his mobile phone, the IoT devices, wearables etc., and gets his activities, and the set of people near him (based on inter-mobile talking) at different segments of time. The email server then sends a message (e.g., in an AJAX script) to this particular user's computer, loading a question and a set of radio buttons to select the answer from.

For example, the question may be "What did you do at 8:30 AM today?", and possible answers are sent to a display on the particular user's electronic device (e.g., his smart phone) as radio buttons (active fields that are able to receive a selection by the user) that say: "drank tea", "sat still/meditated", "talked to Person B", "talked to mother on the phone". In this scenario, since this particular user was meditating at 8:30 AM today, he will click the radio button for "sat still/meditated", which a monitoring device (e.g., location-based activities monitor 204 shown in FIG. 2) observed. By selecting this correct radio button, the email server will allow this particular user to log in and check his email.

Exemplary Embodiment/Use Case 2

In another embodiment, assume that the scenario described in Exemplary Embodiment/Use Case 1 still applies, but that Person C is detected (e.g., by the supervisory computer 153) as being next to the electronic device that belongs to the particular user (who actually owns and/or is authorized to use that electronic device). Thus, if the supervisory computer 153 were to ask a question such as "Who were you with yesterday at 11:00 PM", then Person C (who was with the particular user at that time) would know that the answer is "Person C", and thus could improperly log in as the particular user. In order to prevent this improper activity, the supervisory computer 153 will 1) detect that Person C is by the particular user's computer, and 2) block any questions that could be answered by Person C (e.g., "Was the Particular User with Person C yesterday at 11:00 PM") from being used as an authentication question.

The current invention assumes the following technical components/assets/capabilities to exist as necessary background: 1) smartphones and/or wearable devices; 2) the ability to detect location (such as with GPS) on the devices; 3) systems to detect richer context, such as physiological parameters, locomotive states (sitting, driving a car, etc.), other (authorized) systems nearby along with their owners' identifier/identities, etc.; and/or 4) an interface to present a questionnaire and receive and process responses (such as the screen of the smartphone, where the front-end smartphone can be connected to a backend server over a network).

As such, one or more embodiments of the present invention provide a method to mine the activities, locations (context in general), and set of other individuals that a given individual meets and interacts with, along with time information, for a given window of time (or unlimited time).

One or more embodiments of the present invention further provide a method to create questions and present these questions (in one or more embodiments with alternative possible responses such as a multiple-choice response question) to the end user, to be presented at the time of authentication (such as login) on demand, that (a) are related to the activities, locations (context in general) and groups of others, such that (b) the other individuals required to answer in this group are detected as not being nearby to the location of the authentication.

As described herein and in one or more embodiments of the present invention, the method includes receiving a response from the responder and verifying the correctness of the response.

As described herein and in one or more embodiments of the present invention, the method includes invoking a regeneration process of questions if the given responses are determined to be not correct (or sufficiently inaccurate, depending upon the nature of the answers sought for).

Thus, as described in one or more embodiments of the present invention, a system and associated methods trigger a mining process on devices such as smartphones, IoT devices, computer vision systems (such as CCTV cameras) and wearables that mine the context of a given person, such as the location, the set of friends close by, the activities (observable activities such as apps used, websites browsed, or inferred activities such as driving a car, etc.), etc. Later, when the person attempts to log onto different services/portals that subscribe to this security system, the system presents a questionnaire to authenticate the person, where the answers to the asked questions will be derivable from the information mined. The authentication can be a single-factor authentication (i.e., based on a single past activity of the particular user) or a multi-factor authentication (i.e., based on multiple past activities of the particular user).

Figure 2:
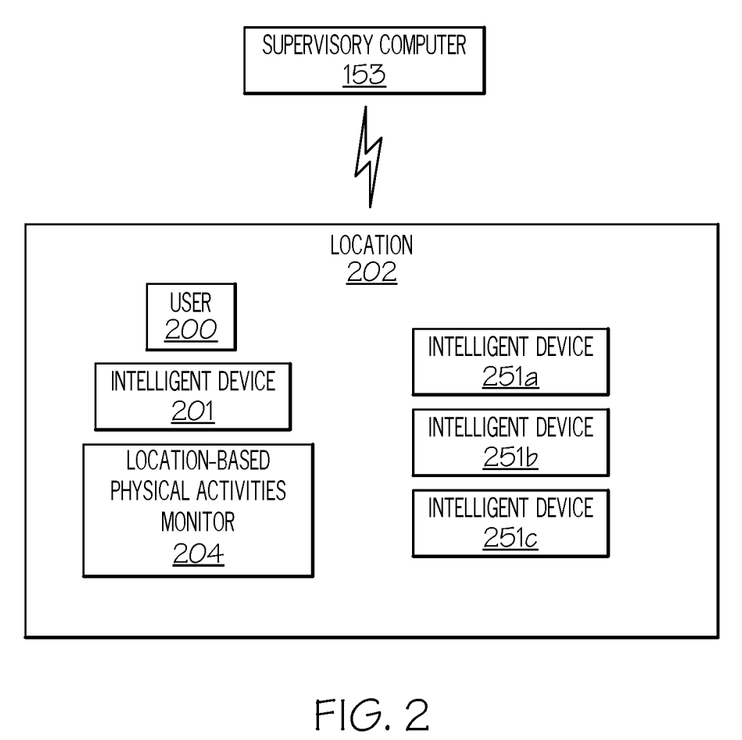
FIG. 2 illustrates an architectural overview of one or more embodiments of the present invention.

With reference now to FIG. 2, an architectural overview of one or more embodiments of the present invention is presented.

Assume that a user 200 is at a location 202. Assume further that user 200 is in possession of an intelligent device 201 (e.g., a smart phone that includes some or all of the architecture of computer 101 shown in FIG. 1).

Assume further that the physical activities (e.g., game playing, movement, sleeping, etc.) of user 200 are tracked by a location-based physical activities monitor 204 (e.g., a camera, a motion detector, etc.).

Furthermore, the location of other persons is detected by the presence of intelligent devices 251a-251c (analogous to other intelligent devices 151 shown in FIG. 1), which may be smart phones, etc. that are equipped with position logic 123 shown in FIG. 1. That is, each of the intelligent devices are 1) associated with another person (e.g., an owner of one of the particular intelligent devices), and 2) give the location at a particular time of that other person.

All such information from intelligent device 201, location-based physical activities monitor 204, and intelligent devices 251a-251c are shared with the supervisory computer 153 introduced in FIG. 1.

Thus, the intelligent device 201 (e.g., a smart phone) is able to track where user 200 is; location-based physical activities monitor 204 is able to detect movement and other physical activities of user 200; and intelligent devices 251-251c detect who is with user 200 at a particular time and location.

Figure 3:
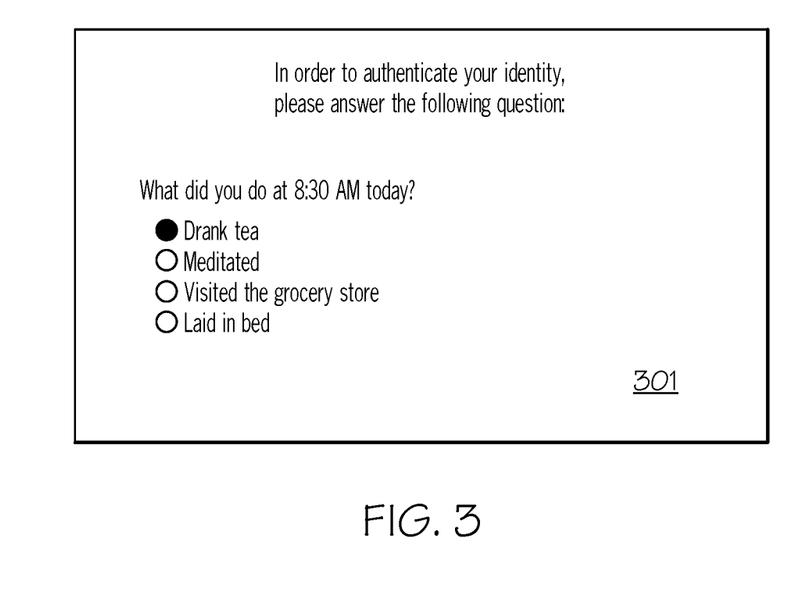
FIG. 3 depicts a graphical user interface (GUI) on a computer that requires an authentication of a user in accordance with one or more embodiments of the present invention.

With reference now to FIG. 3, assume that supervisory computer 153 shown in FIG. 2 has determined that user 200 was drinking tea at 8:30 AM today (as detected by location-based physical activities monitor 204, which captured an image of user 200 drinking tea at that time). As such "Drank tea" is one of the candidate answers to the question "What did you do at 8:30 AM today" that is presented to user 200. By answering this question correctly (i.e., clicking the radio button in graphical user interface (GUI) 301 that is associated with the answer "Drank tea"), the supervisory computer is able to confirm the identity of user 200. Thus, if user 200 tries to log in to a device (e.g., his laptop computer) or access a service (e.g., email), then answering this question correctly authorizes the user 200. That is, in one embodiment, simply answering the question correctly authenticates user 200. In another embodiment, the user must enter his password (e.g., a predefined password that was set up by user 200), and then further confirm his identity by correctly answering the questions presented in GUI 301.

Figure 4:
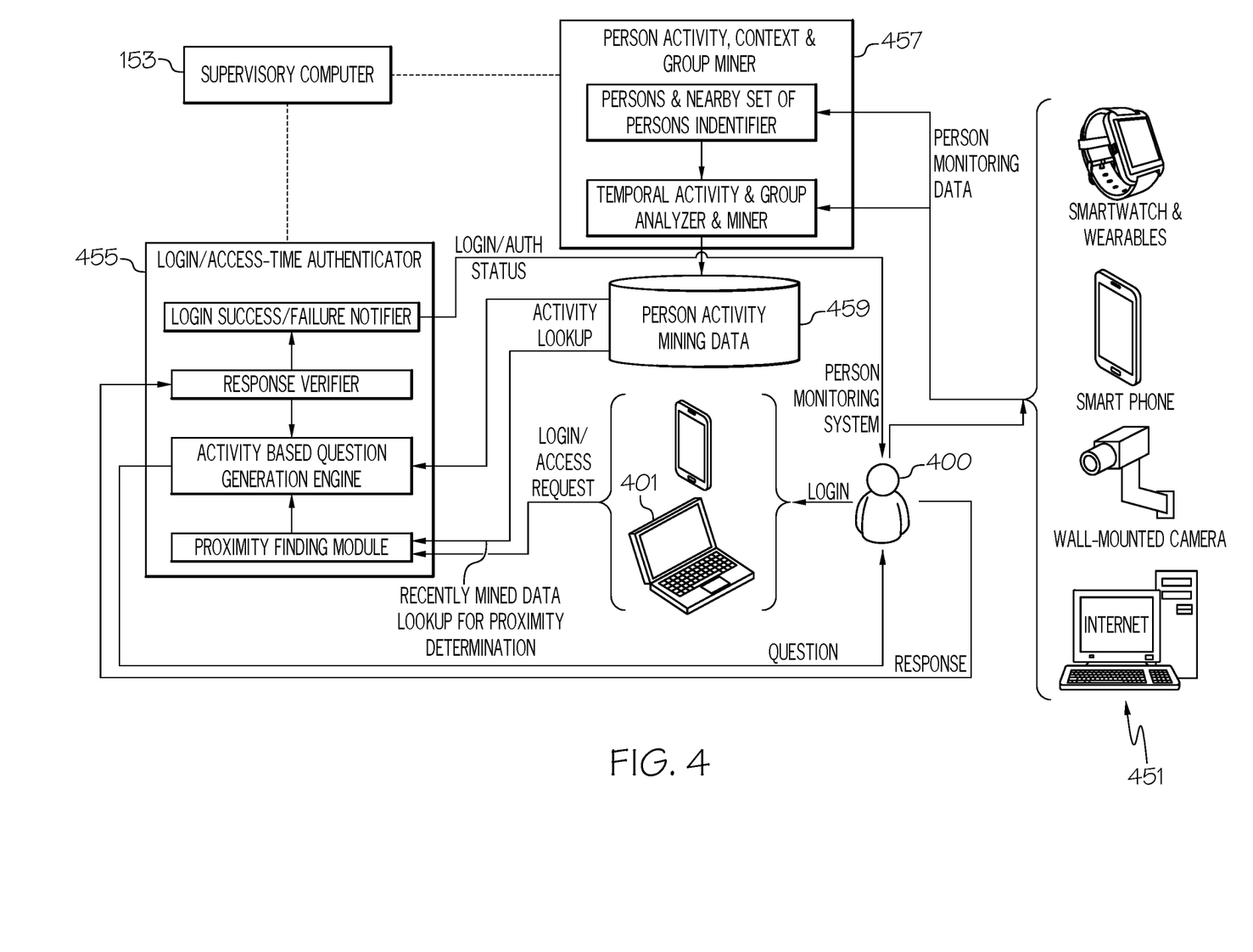
FIG. 4 illustrates addition detail of one or more embodiments of the present invention.

With reference now to FIG. 4, addition detail of one or more embodiments of the present invention is presented.

As shown in FIG. 4, one or more monitoring devices 451 (analogous to intelligent device 201, intelligent devices 251a-251c, and/or location-based physical activities monitor 204 shown in FIG. 2) monitor the activities of person 400 (analogous to user 200 shown in FIG. 2), including the presence of other persons, movement of person 400, etc.

Assume now that person 400 attempts to log in to computer 401 (analogous to computer 101 shown in FIG. 1). A login/access-time authenticator 455 (analogous to login/access-time authenticator 155 shown in FIG. 1), which may or may not be under the control of supervisory computer 153), determines that additional verification of the identity of person 400 is needed. As such, a proximity finding module receives recently mined data from a person activity mining data 459 (i.e., data found in the person activity mining data server 159 shown in FIG. 1) about activities mined by person activity, context and group miner 457 (analogous to person activity, context and group miner 157 shown in FIG. 1). That is, person activity, context and group miner 457 receives information from monitoring devices 451 about past activities (and their context, such as where and when they occur and with whom, if anyone) of person 400. This information is stored in the person activity mining data 459, which is data mined by the login/access-time authenticator 455 using the proximity finding module (e.g., part of PAUED 147 shown in FIG. 1). This enables the login/access-time authenticator 455 to direct an activity based question generation engine (e.g., part of PAUED 147 shown in FIG. 1) to generate and send a verification question about the user's past activities to the person 400. The person responds with a response, which the response verifier (e.g., part of PAUED 147 shown in FIG. 1) confirms to be the correct answer to the question, leading a login success/failure notifier (e.g., part of PAUED 147 shown in FIG. 1) to authorize the person 400 to log in. If the response is incorrect, then the login success/failure notifier will block the person 400 from logging in, and may or may not give person 400 a second chance to answer another validation question based on the past activities of person 400.

Figure 5:
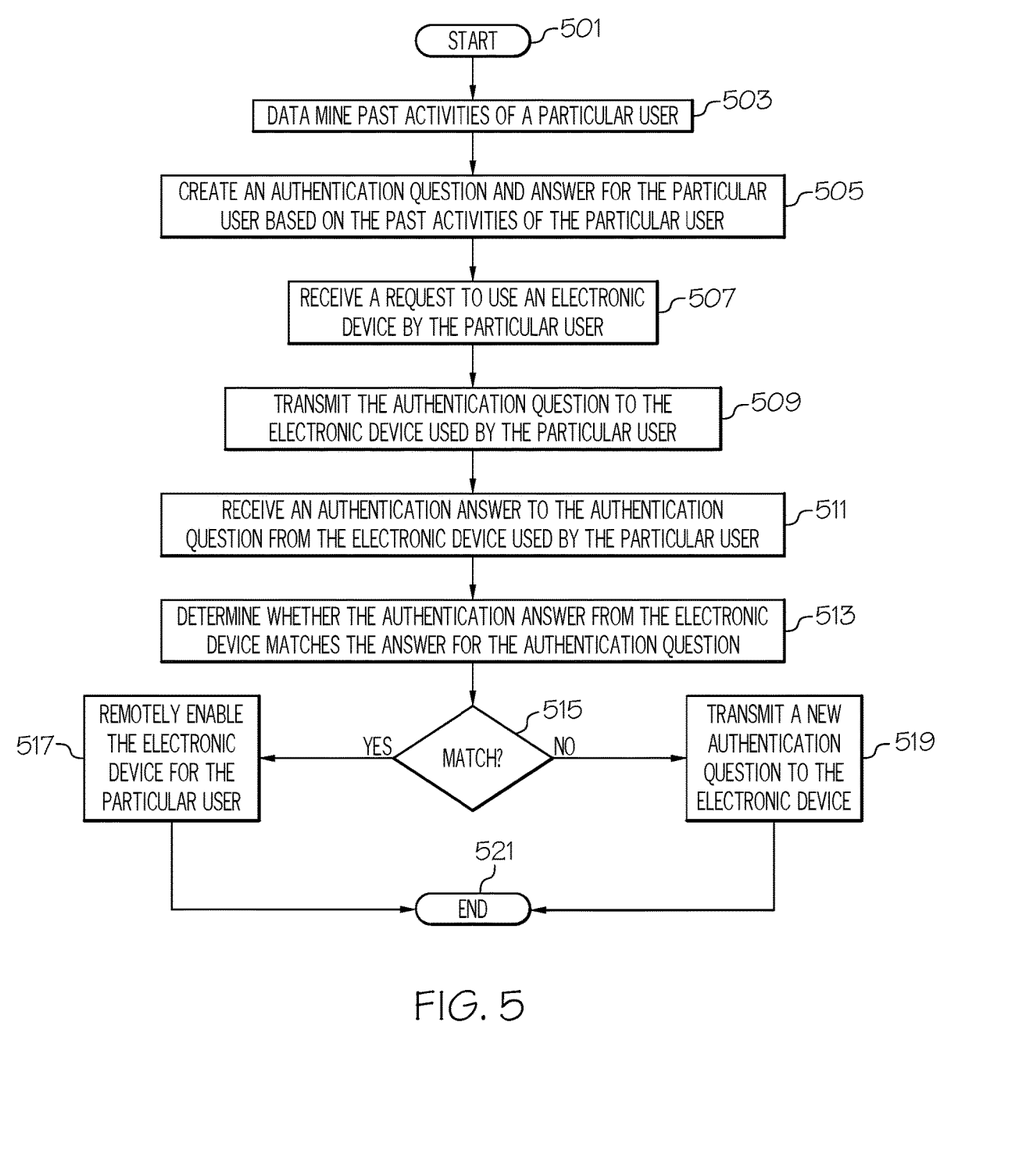
FIG. 5 is a high-level flow chart of one or more steps performed, by one or more processors and/or other hardware devices, in one or more embodiments of the present invention.

With reference now to FIG. 5, a high-level flow chart of one or more steps performed, by one or more processors and/or other hardware devices, in one or more embodiments of the present invention is presented. More specifically, FIG. 5 presents exemplary steps in a processor-implemented method for enabling a device based on authentication of a particular user.

After initiator block 501, one or more processors (e.g., within supervisory computer 153) data mine past activities of a particular user, as described in block 503. As described herein, the past activities are detected by physical monitoring devices (e.g., monitoring devices 451 shown in FIG. 4) that monitor the particular user (e.g., person 400).

As described in block 505, the processor(s) create an authentication question and answer for the particular user based on the past activities of the particular user that the one or more processors have data mined (see FIG. 3).

As described in block 507, the processor(s) receive a request to use an electronic device (e.g., a smart phone or other device that utilizes some or all of the architecture used by computer 101 in FIG. 1) by the particular user.

As described in block 509, in response to receiving the request to use the electronic device used by the particular user, the processor(s) transmit the authentication question to the electronic device used by the particular user (see FIG. 4).

As described in block 511, the processors receive an authentication answer to the authentication question from the electronic device used by the particular user (see FIG. 4).

As described in block 513, the processor(s) then determine whether the authentication answer from the electronic device matches the answer for the authentication question. For example, if the authentication question is "What did you do at 8:30 AM today" (see FIG. 3), then the only correct authentication answer would be "Drank tea", which can be input by clicking a radio button, typing in the answer, etc.

A query is made (see query block 515) as to whether the authentication answer from the electronic device matches the answer for the authentication question.

As shown in block 517, in response to determining that the authentication answer from the electronic device matches the answer for the authentication question, the processor(s) remotely enables the electronic device for the particular user.

However, as shown in block 519, in response to determining that the authentication answer from the electronic device does not match the answer for the authentication question, then the processor(s) transmit a new authentication question to the electronic device for the user, thus giving the user a second chance to answer the new authentication question correctly in order to be validated. Alternatively, no second chances are given to the user, and he/she is simply blocked from logging in to the device, application, database, etc.

The flow chart shown in FIG. 5 ends at terminator block 521.

In an embodiment of the present invention the authentication question is a first authentication question that can be answered by a second user who is not allowed to use the electronic device used by the particular user, as described above. In this embodiment, the processor(s) detects that the second party is presently proximate to the electronic device used by the particular user. In response to detecting that the second party is presently proximate to the electronic device used by the particular user, the processor(s) blocks the first authentication question from being transmitted to the electronic device used by the particular user and generates a second authentication question that cannot be answered by the second party. This second authentication question is then sent, instead of the first authentication question, to the electronic device used by the particular user. Thus, this second party cannot answer a question that the authorized party knows the answer to.

In an embodiment of the present invention, the past activities of the particular user are detected by a location-based physical activities monitor (e.g., location-based physical activities monitor 204 shown in FIG. 2) that identifies physical activities performed by the particular user during a previous time, such as lying down, moving about, playing a game, etc.

In an embodiment of the present invention, the past activities of the particular user are detected by intelligent devices that are possessed by other persons during a previous time. That is, if the "past activity" is being physically present in the same area as other persons, then those other persons' smart phones will have a record of where they were and when, in order to confirm/validate/detect that they were in the same area as a particular person at a particular time.

In an embodiment of the present invention, the past activities occurred within a past 24 hours. That is, in this embodiment, the past activities being monitored for the person are not unlimited, but rather are limited to only those activities that recently occurred. In a preferred embodiment, a record of the activities of that person are automatically erased after 24 hours, in order to 1) save memory space, since earlier activities are likely to not be recalled correctly by the user, and 2) to protect long-term privacy of the user and others around him/her.

The present invention may be implemented in one or more embodiments using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
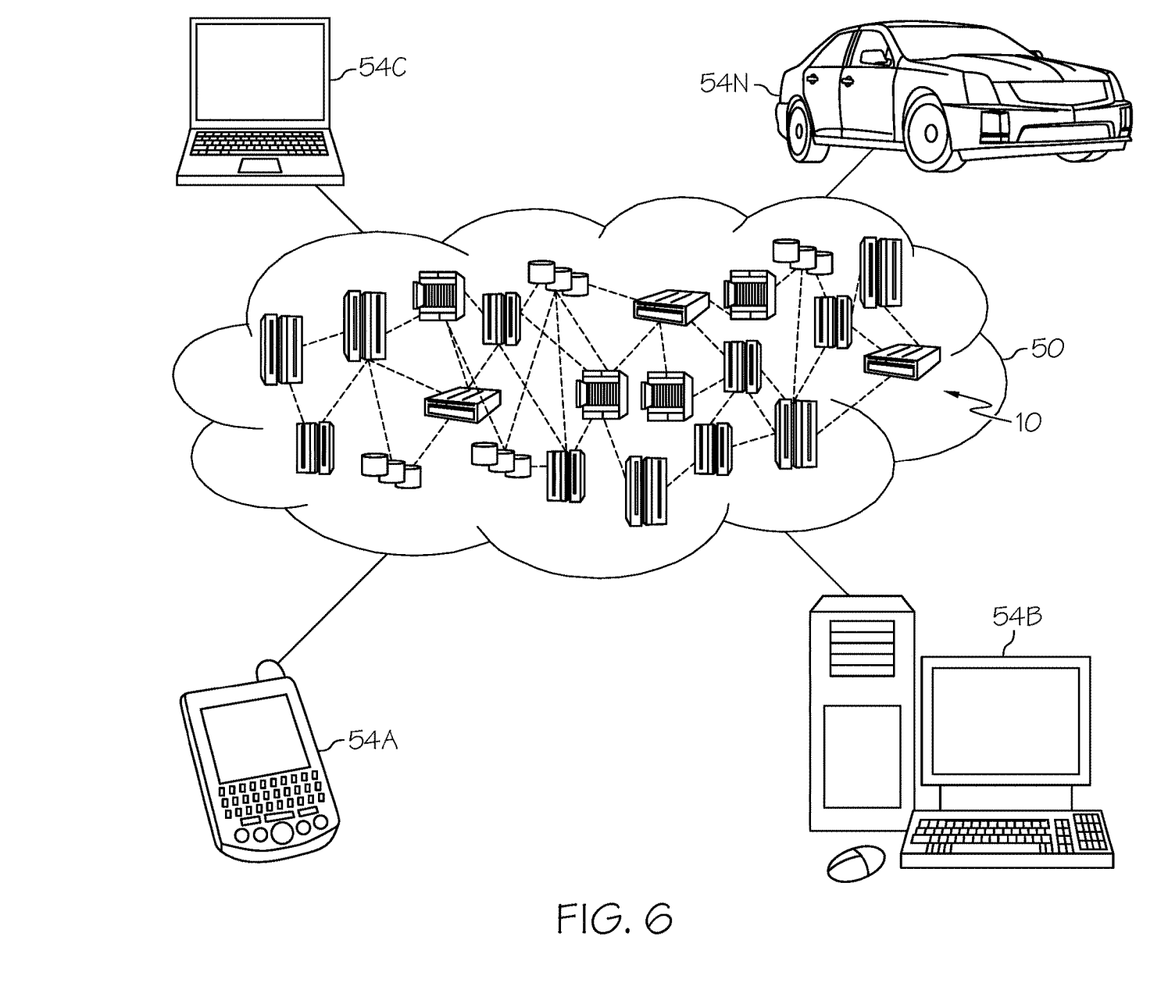
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 6 are intended to be illustrative only and that computing nodes 10 and cloud computing environment 50 can communicate with any type of computerized device over any type of network and/or network addressable connection (e.g., using a web browser).

Figure 7:
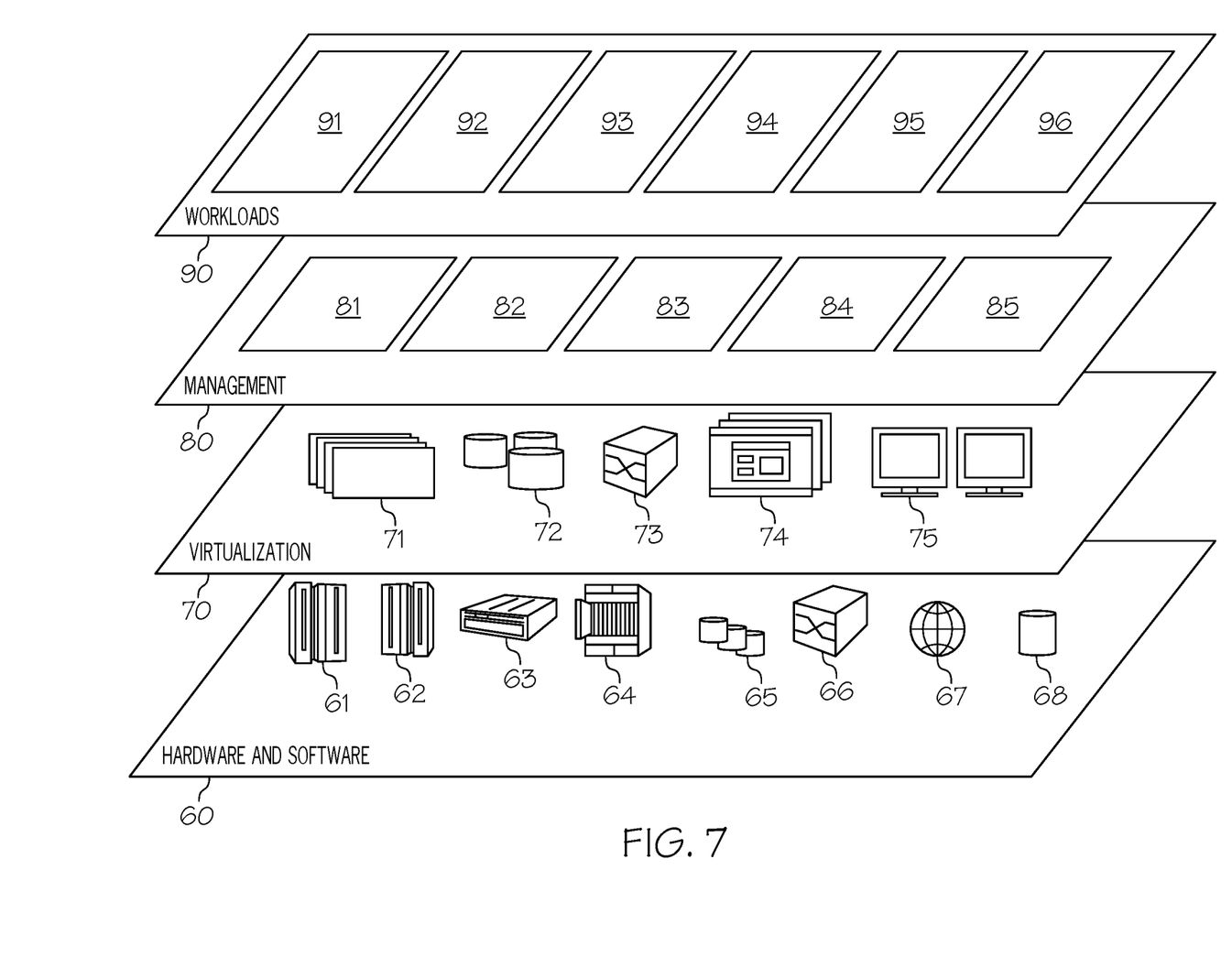
FIG. 7 depicts abstraction model layers of a cloud computer environment according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and user authentication processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A processor-implemented method comprising:
    data mining, by one or more processors, past activities of a particular user, wherein the past activities are detected by physical monitoring devices that monitor the particular user;
    creating, by one or more processors, a first authentication question and answer for the particular user based on the past activities of the particular user that the one or more processors have data mined, wherein the first authentication question can be answered by a second user who is not permitted to use the electronic device used by the particular user;

receiving, by one or more processors, a request to use an electronic device used by the particular user;

in response to receiving the request to use the electronic device used by the particular user, transmitting, by one or more processors, the first authentication question to the electronic device used by the particular user;

receiving, by one or more processors, an authentication answer to the first authentication question from the electronic device used by the particular user;

determining, by one or more processors, whether the authentication answer from the electronic device matches the answer for the first authentication question;

in response to determining that the authentication answer from the electronic device matches the answer for the first authentication question, remotely enabling, by one or more processors, the electronic device for the particular user;

detecting, by one or more processors, that the second user is presently proximate to the electronic device used by the particular user;

in response to detecting that the second user is presently proximate to the electronic device used by the particular user, blocking, by one or more processors, the first authentication question from being further transmitted to the electronic device used by the particular user and generating, by one or more processors, a second authentication question that cannot be answered by the second user; and transmitting, by one or more processors, the second authentication question to the electronic device used by the particular user.

2. The processor-implemented method of claim 1, further comprising:

in response to determining that the authentication answer to the first authentication question from the electronic device does not match the answer for the first authentication question, transmitting, by one or more processors, a new authentication question to the electronic device for the user.

3. The processor-implemented method of claim 1, wherein the past activities of the particular user are detected by a location-based physical activities monitor that identifies physical activities performed by the particular user during a previous time.

4. The processor-implemented method of claim 1, wherein the past activities of the particular user are detected by intelligent devices that are possessed by other persons during a previous time.

5. The processor-implemented method of claim 1, wherein the past activities occurred within a past 24 hours.

6. A computer program product for enabling a device based on authentication of a particular user, the computer program product comprising a non-transitory computer readable storage device having program instructions embodied therewith, the program instructions readable and executable by a computer to perform a method comprising:

data mining past activities of a particular user, wherein the past activities are detected by physical monitoring devices that monitor the particular user;

creating a first authentication question and answer for the particular user based on the past activities of the particular user that the one or more processors have data mined, wherein the first authentication question can be answered by a second user who is not permitted to use the electronic device used by the particular user;

receiving, by one or more processors, a request to use an electronic device used by the particular user;

in response to receiving the request to use the electronic device used by the particular user, transmitting, by one or more processors, the first authentication question to the electronic device used by the particular user;

receiving an authentication answer to the first authentication question from the electronic device used by the particular user;

determining whether the authentication answer from the electronic device matches the answer for the first authentication question;

in response to determining that the authentication answer from the electronic device matches the answer for the first authentication question, remotely enabling the electronic device for the particular user;

detecting that the second user is presently proximate to the electronic device used by the particular user;

in response to detecting that the second user is presently proximate to the electronic device used by the particular user, blocking the first authentication question from being further transmitted to the electronic device used by the particular user and generating a second authentication question that cannot be answered by the second user; and transmitting the second authentication question to the electronic device used by the particular user.

7. The computer program product of claim 6, wherein the method further comprises:

in response to determining that the authentication answer to the first authentication question from the electronic device does not match the answer for the first authentication question, transmitting a new authentication question to the electronic device for the user.

8. The computer program product of claim 6, wherein the past activities of the particular user are detected by a location-based physical activities monitor that identifies physical activities performed by the particular user during a previous time.

9. The computer program product of claim 6, wherein the past activities of the particular user are detected by intelligent devices that are possessed by other persons during a previous time.

10. The computer program product of claim 6, wherein the past activities occurred within a past 24 hours.

11. The computer program product of claim 6, wherein the program instructions are provided as a service in a cloud environment.

12. A computer system comprising one or more processors, one or more computer readable memories, and one or more computer readable storage mediums, and program instructions stored on at least one of the one or more storage mediums for execution by at least one of the one or more processors via at least one of the one or more memories, the stored program instructions comprising:

program instructions to data mine past activities of a particular user, wherein the past activities are detected by physical monitoring devices that monitor the particular user;

program instructions to create a first authentication question and answer for the particular user based on the past activities of the particular user that the one or more processors have data mined, wherein the first authentication question can be answered by a second user who is not permitted to use the electronic device used by the particular user;

program instructions to receive a request to use an electronic device used by the particular user;

program instructions to, in response to receiving the request to use the electronic device used by the particular user, transmit the first authentication question to the electronic device used by the particular user;

program instructions to receive an authentication answer to the first authentication question from the electronic device used by the particular user;

program instructions to determine whether the authentication answer from the electronic device matches the answer for the first authentication question;

program instructions to, in response to determining that the authentication answer from the electronic device does not match the answer for the first authentication question, transmit a new authentication question to the electronic device for the user;

program instructions to detect that the second user is presently proximate to the electronic device used by the particular user;

program instructions to, in response to detecting that the second user is presently proximate to the electronic device used by the particular user, block the first authentication question from being further transmitted to the electronic device used by the particular user and generate a second authentication question that cannot be answered by the second user; and program instructions to transmit the second authentication question to the electronic device used by the particular user.

13. The computer system of claim 12, wherein the past activities of the particular user are detected by a location-based physical activities monitor that identifies physical activities performed by the particular user during a previous time.

14. The computer system of claim 12, wherein the past activities of the particular user are detected by intelligent devices that are possessed by other persons during a previous time.

15. The computer system of claim 12, wherein the past activities occurred within a past 24 hours.

16. The computer system of claim 12, wherein the program instructions are provided as a service in a cloud environment.

* * * * *